United States Patent [19]

Moroto et al.

[11] Patent Number: 5,389,824
[45] Date of Patent: Feb. 14, 1995

[54] POWER SUPPLY CUT OFF APPARATUS

[75] Inventors: Shuzo Moroto; Mutumi Kawamoto, both of Tokyo, Japan

[73] Assignee: Kabushiki Kaisha Equos Research, Tokyo, Japan

[21] Appl. No.: 32,246

[22] Filed: Mar. 17, 1993

[30] Foreign Application Priority Data

Mar. 17, 1992 [JP] Japan .................................. 4-092016

[51] Int. Cl.⁶ ............................................ B60R 16/02
[52] U.S. Cl. .................................. 307/10.1; 180/283; 280/735
[58] Field of Search ............... 307/9.1, 10.1, 10.6, 307/10.7; 180/271, 274, 281, 282, 283, 286; 280/727, 734, 735; 340/425.5, 436, 437, 440

[56] References Cited

U.S. PATENT DOCUMENTS

| 3,886,535 | 5/1975 | Cirincione | 307/9.1 |
| 4,524,287 | 6/1985 | Brannen | 307/10.1 |
| 5,089,762 | 2/1992 | Sloan | 307/10.7 |
| 5,170,151 | 12/1992 | Hochstein | 307/10.7 |

FOREIGN PATENT DOCUMENTS 58-22483 2/1983 Japan .
259052 4/1990 Japan .

Primary Examiner—Jeffrey A. Gaffin
Attorney, Agent, or Firm—Sandler, Greenblum & Bernstein

[57] ABSTRACT

A power supply cut off apparatus is provided in which a DC power supply voltage supplied from a main power supply is converted into an AC current by an inverter of a driver, and brushless DC motors are driven by the converted current, during normal operation. In the normal operation, an abnormal state of an electrical vehicle, such as collision, is detected by a plurality of sensors, and collision detection signals are supplied to a diagnosis section. The diagnosis section determines whether an actual collision has occurred or detects a state in which a collision is unavoidable on the basis of the collision detection signals and, as a result, supplies a power cutoff signal to a circuit breaker. The circuit breaker cuts off the output of power supply voltage from the main power supply to the driver using relays.

12 Claims, 9 Drawing Sheets

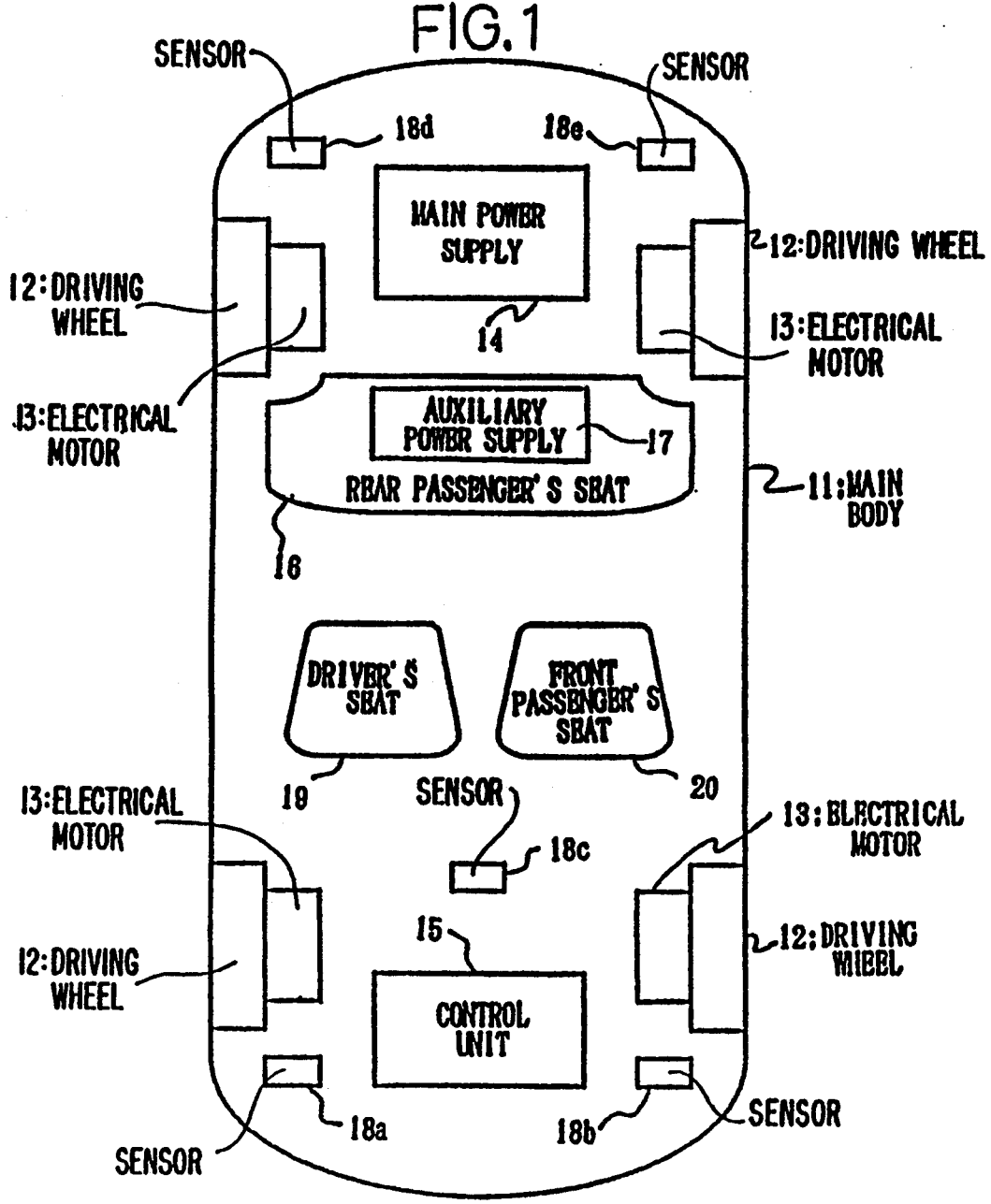

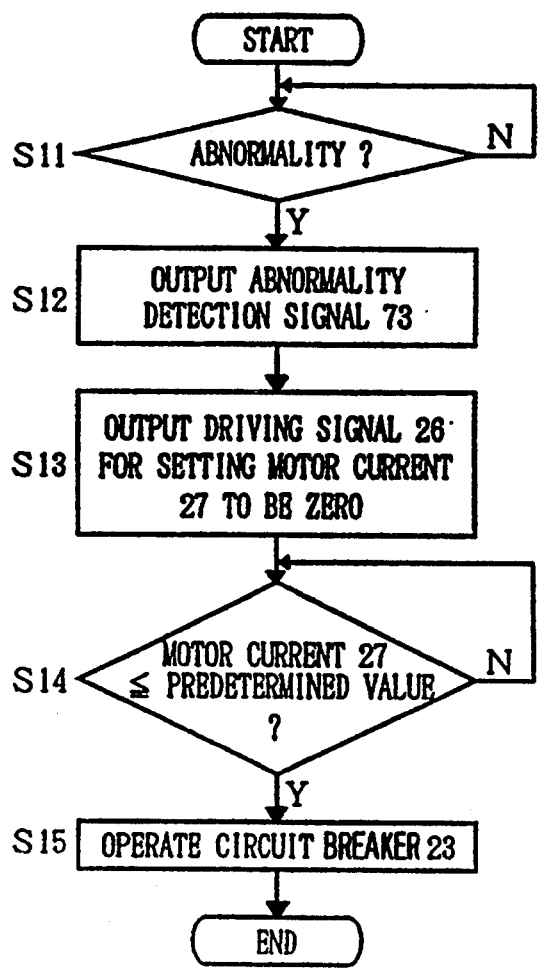

POWER SUPPLY CUT OFF APPARATUS

BACKGROUND OF THE INVENTION

1. Field of the Invention

The present invention relates to a power supply cut off apparatus for an electrical vehicle. More the present invention relates to a power supply cut off apparatus for an electrical vehicle, which can assure isolate power supply upon the detection of an abnormal condition of the electrical vehicle.

2. Description of the Related Art

In recent years, there has been a growing interest in the environment of the earth, and an increasing social demand for preventing natural environmental disruption and global warming due to air pollution, and worsening of residential space due to noise. Under these circumstances, an electrical vehicle, which does not always use an internal combustion engine as a driving source, but rather drives a vehicle using clean electric power as a driving source, is receiving a lot of attention, and has been widely studied and developed.

The electrical vehicle may comprise a large-capacity driving power supply, and an electrical motor that is rotated by an electric power supplied from the driving power supply to obtain a driving force to the vehicle.

Since the electrical vehicle comprises a driving circuit for an electrical motor, the electrical motor is driven with a voltage higher more than that of other electrical components, such as power windows.

For example, in a conventional electrical vehicle, the positive and negative terminals of the driving power supply are arranged to electrically float from a body, independently of a low-voltage power supply for other electrical components, which power supply is grounded to the body at the negative terminal.

An internal combustion engine vehicle using a gasoline engine comprises the following battery cut off apparatus against collision.

Japanese Utility Model Publication No. 2-59052 discloses an arrangement for cutting off a power supply from a battery to the respective portions of the vehicle upon collision. Japanese Patent Laid-Open No. 58-224833 also discloses an arrangement for quickly cutting off a power supply from a battery power supply to the respective portions of the vehicle. The power supply is cut off upon collision in a vehicle having a gasoline engine for the following reason. That is, when a gasoline leaks upon collision, an electrical spark generated by a short-circuited battery may ignite the leaking gasoline.

SUMMARY OF THE INVENTION

It is an object of the present invention to provide an electrical vehicle, which can cut off a power supply for a vehicle driving electrical motor in an abnormal condition of the vehicle, such as collision.

It is another object of the present invention to provide an electrical vehicle, which can cut off a power supply for a vehicle driving electric motor when the driving power supply delivers driving current to the electric motor.

BRIEF DESCRIPTION OF THE DRAWINGS

The above and other objects and advantages of the present invention will be more fully understood in consideration of a description, taken in conjunction with the accompanying drawings, for explaining a power supply cut off apparatus for an electrical vehicle according to the present invention, in which:

FIG. 1 is a plan view showing an arrangement of the respective sections of a power supply cut off apparatus for an electrical vehicle according to the first embodiment of the present invention;

FIG. 9 is a flow chart showing an operation of the third embodiment.

DETAILED DESCRIPTION OF THE PREFERRED EMBODIMENTS

Figure 2A:
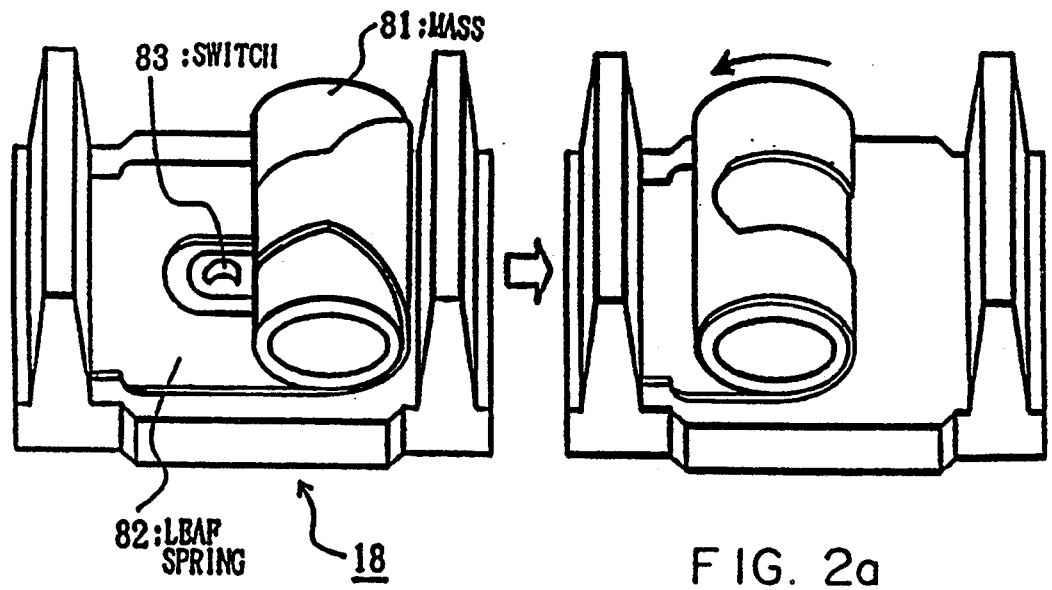
FIGS. 2A and 2B are perspective views showing the outer appearance of a rolamite collision sensor.

The preferred embodiments of a power supply cut off apparatus for an electrical vehicle according to the present invention will be described in detail hereinafter with reference to FIGS. 1 to 9.

FIG. 1 shows an arrangement of respective sections in an electrical vehicle.

As shown in FIG. 1, a main body 11 of an electrical vehicle comprises four driving wheels, i.e., right and left front and rear driving wheels 12. These driving wheels 12 include electrical motors 13 as driving means for rotating the corresponding wheels. Each electrical motor (not shown) 13 comprises a brushless DC motor having a rotor consisting of a 6-pole permanent magnet, and an electromagnetic coil consisting of three-phase windings, i.e., a stator coil.

Note that the electrical vehicle includes a vehicle in which a motor is arranged on a vehicle body, and wheels are driven through, e.g., a differential gear, a vehicle which drives wheels by combining an internal combustion engine and a motor, in addition to the above-mentioned arrangement wherein the motors are arranged in the wheels.

A main power supply 14 as a driving power supply is arranged on the rear portion of the main body 11. The main power supply 14 may adopt various secondary batteries such as a lead acid storage battery, a nickel-cadmium battery, a sodium sulfur battery, a lithium secondary battery, a hydrogen secondary battery, a redox type battery, and the like. The main power supply 14 outputs, e.g., a DC power supply voltage of 240 V, which is supplied to a control unit 15 arranged in the front portion of the main body 11. A main power supply circuit (not shown) constituted by the main power supply 14 does not use the main body 11 as a power supply loop, but constitutes an independent supply loop. The control unit 15 converts a power supply voltage supplied from the main power supply 14 into a three-phase current using, e.g., an inverter, and performs various control operations e.g., for supplying a predetermined electric power matching with a traveling condition of the electrical vehicle to the electric motors 13, cutting off the power supply voltage from the main power supply 14, and so on. The negative terminal of the auxiliary power supply 17 is connected to the body as earth, and an auxiliary power supply circuit (not shown) constituted by the auxiliary power supply 17 uses the main body 11 as a power supply loop.

The electrical vehicle comprises an auxiliary power supply 17 under a rear passenger's seat 16. The auxiliary power supply 17 is grounded to a body at its negative terminal, and supplies voltage of 12 V. The power supply 17 operates a wiper, a car audio system, and the like, and is used for illuminating various meters.

Collision detection sensors 18a–18e, as state detection sensors, are arranged at five positions of the main body 11 of the electrical vehicle. First and second collision sensors 18a and 18b are arranged in front of side frames (not shown), a third collision sensor 18c is arranged in a front portion of a passenger's room between a driver's seat 19 and a front passenger's seat 20, and fourth and fifth collision sensors 18d and 18e are arranged behind the side frames.

Each collision sensor 18a–18e may adopt various collision sensors, such as an electrical sensor such as a strain gauge type sensor, a piezo type sensor, and the like, for detecting a collision by integrating a signal output from an accelerometer, a rolamite type sensor in which a leaf spring is wound around a roller-like mass (an inertial member for detecting deceleration due to collision), a viscous damping type sensor for detecting a collision by a spherical mass arranged in a cylinder based on an attracting force of a magnet and a viscous force of air passing through a gap between the mass and the cylinder, and the like. The collision sensors 18a–18e may be of either the same type or different types. In this embodiment, five rolamite type collision sensors are used.

Figure 2B:
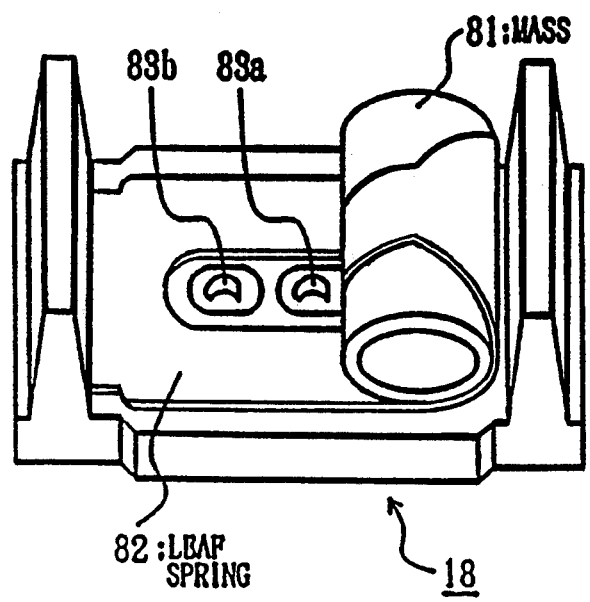

FIGS. 2A and 2B show the outer appearance of the arrangement of a rolamite type collision sensor 18 used for sensors 18a–18e in this embodiment.

As shown in FIG. 2A, a roller-like mass 81 serving as an inertial member is pressed against the right side (in FIG. 2B) by a leaf spring 82 wound around the outer circumferential surface of the mass 81. Upon reception of deceleration caused by a collision, the mass 81 is rotated to the left to close a switch 83, thereby outputting a collision detection signal J.

When the spring constant of the leaf spring 82 wound around the mass 81 is appropriately selected, a degree of collision for outputting the collision detection signal J can be changed. In this embodiment, the collision sensor 18c arranged in the passenger's room between the driver's seat 19 and the front passenger's seat 20 outputs a collision detection signal Jc by a weaker shock than the remaining four collision sensors 18a, 18b, 18d, and 18e.

As shown in FIG. 2B, a collision sensor 18 in which first and second switches 83a and 83b are arranged in the rotational direction of the mass 81, and the width of the leaf spring 82 is increased at its middle portion may be used. With the collision sensor 18 with two-step switches, the first switch 83a is closed by a relatively weak shock. However, since the width of the leaf spring 82 is increased from its middle portion, and this portion of the leaf spring 82 has a large spring constant, the second switch 83b is not closed. Upon reception of a stronger shock, since the mass 81 is further moved to the left, the second switch 83b is closed. Thus, a collision detection signal J can be output according to the magnitude of a shock.

Figure 3:
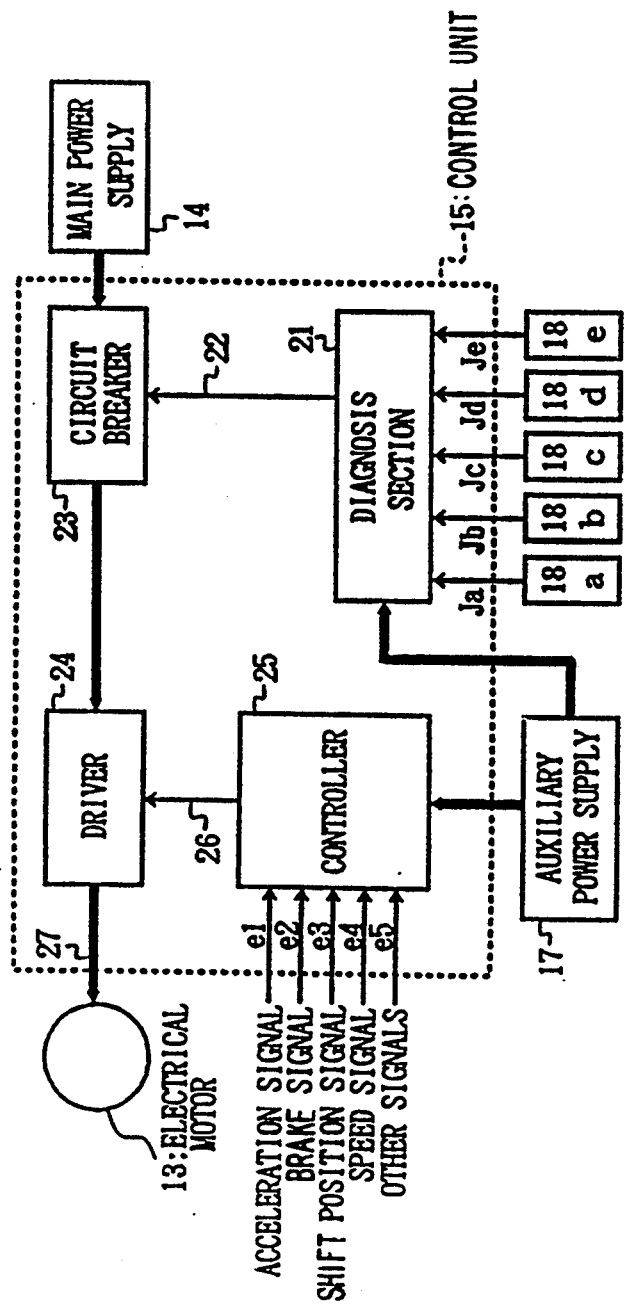
FIG. 3 is a block diagram showing a circuit arrangement of a control unit and its peripheral circuits.

FIG. 3 is a block diagram showing the arrangement of the control unit 15.

As shown in FIG. 3, the control unit 15 comprises a diagnosis section 21 as a collision diagnosis means for diagnosing whether or not a collision occurred on the basis of collision detection signals Ja to Je supplied from the five collision sensors 18a to 18e. The diagnosis section 21 normally uses the auxiliary power supply 17 (second power supply) as a power supply, and is backed up by a large-capacity capacitor such as an electric double layer capacitor to prepare for a collision state.

When the diagnosis section 21 determines that a collision occurred, a power supply cutoff signal 22 is supplied to a circuit breaker 23 as a power supply opening means.

The circuit breaker 23 comprises, e.g., an electromagnetic relay (not shown) and supplies a power supply voltage from the main power supply 14 to a driver 24 in a normal operation state of the electrical vehicle. However, upon reception of the power supply cutoff signal 22 from the diagnosis section 21, the circuit breaker 23 cuts off an electrical connection between the two terminals of the main power supply 14. The circuit breaker 23 is arranged near the main power supply 14, and the input terminal of the circuit breaker 23 is connected to the output terminal of the main power supply 14 by a wiring as short as possible, so that short-circuiting caused by the wiring portion can be prevented upon collision.

The driver 24 comprises an inverter circuit (not shown). The driver 24 converts a power supply voltage supplied from the main power supply 14 through the circuit breaker 23 into a UVW three-phase current, and supplies the current to the corresponding phases of the stator coils (not shown) of the electrical motors 13. The driver 24 receives a driving signal 26 based on various signals output according to driver's operations from a controller 25. The driver 24 supplies a motor current 27 according to this driving signal 26 as a driving current from the main power supply 14 to the electrical motors 13, and also as a regenerative current from the electrical motors 13 to the main power supply 14. The rotational speeds of the electrical motors 13 and the traveling state of the electrical vehicle are controlled according to the driving signal 26.

The controller 25 comprises a main computer (not shown) constituted by a known ROM (read-only memory), a RAM (random-access memory), a CPU (central processing unit), a bus line such as a data bus, and the like, and systematically controls the operations of the electrical vehicle.

More specifically, the controller 25 receives an acceleration signal e1 output from an acceleration sensor and corresponding to the depression amount of an accelerator pedal, a brake signal e2 output from a brake sensor and corresponding to the depression amount of a brake pedal, a shift position signal e3 output in correspondence with a range position of a shift lever, a speed signal e4 obtained by electromagnetically picking up the rotational speeds (the rotational frequency) of the electrical motors 13, and other signals e5, and outputs the driving signal 26 according to these signals, e1–e5.

Figure 4A:
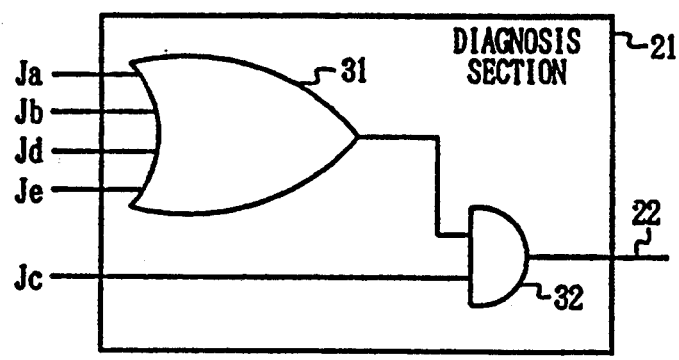
FIGS. 4A and 4B are circuit diagrams of a diagnosis section in the control unit.
Figure 4B:
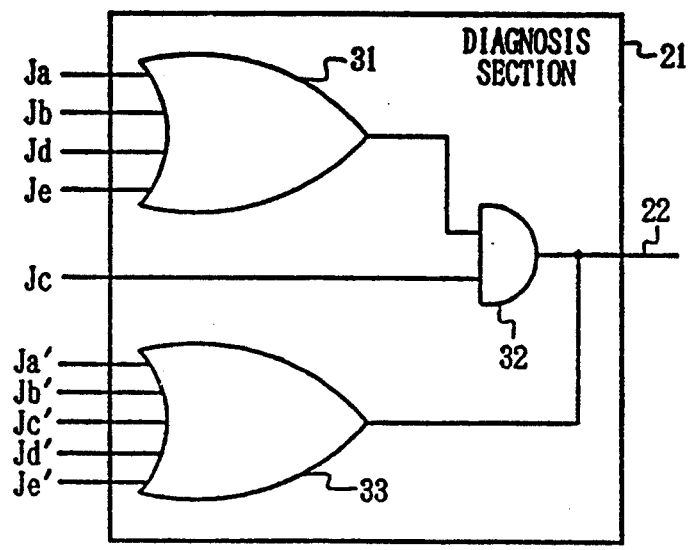

FIGS. 4A and 4B show schematic arrangements of the diagnosis section 21. FIG. 4A shows an arrangement when the one-step type collision sensor shown in FIG. 2A is used as the collision sensor 18.

The diagnosis section 21 comprises a 4-input OR gate 31 for receiving outputs from the collision sensors 18a, 18b, 18d, and 18e arranged at front and rear positions of the main body 11, and a 2-input AND gate 32 for receiving the output from the OR gate 31, and an Jc from the collision sensor 18c arranged in the passenger's room, and operates in response to a weaker shock than the remaining sensors.

With this arrangement, when one of the collision sensors 18a, 18b, 18d, and 18e arranged at the front and rear positions of the main body 11, and the collision sensor 18c arranged in the passenger's room simultaneously output collision output signals Ja–Jc, the diagnosis section 21 determines that a collision of the vehicle occurred, and outputs the power supply cutoff signal 22.

FIG. 4B shows an arrangement of the diagnosis section 21 when the two-step type collision sensor 18 shown in FIG. 2B is used.

This diagnosis section 21 comprises a 5-input gate 33 in addition to the circuit of the diagnosis section shown in FIG. 4A. Collision detection signals Ja, Jb, Jd, and Je output from the first switches 83a of the collision sensors 18a, 18b, 18d, and 18e are supplied to the OR gate 31, and a collision detection signal Jc is supplied to the AND gate 32. Collision detection signals Ja' to Je' output from the second switches 83b are supplied to the OR gate 33.

In the diagnosis section 21 shown in FIG. 4B, when one of the collision detection signals Ja' to Je' from the second switches is output, the power supply cutoff signal 22 is output.

Figure 5:
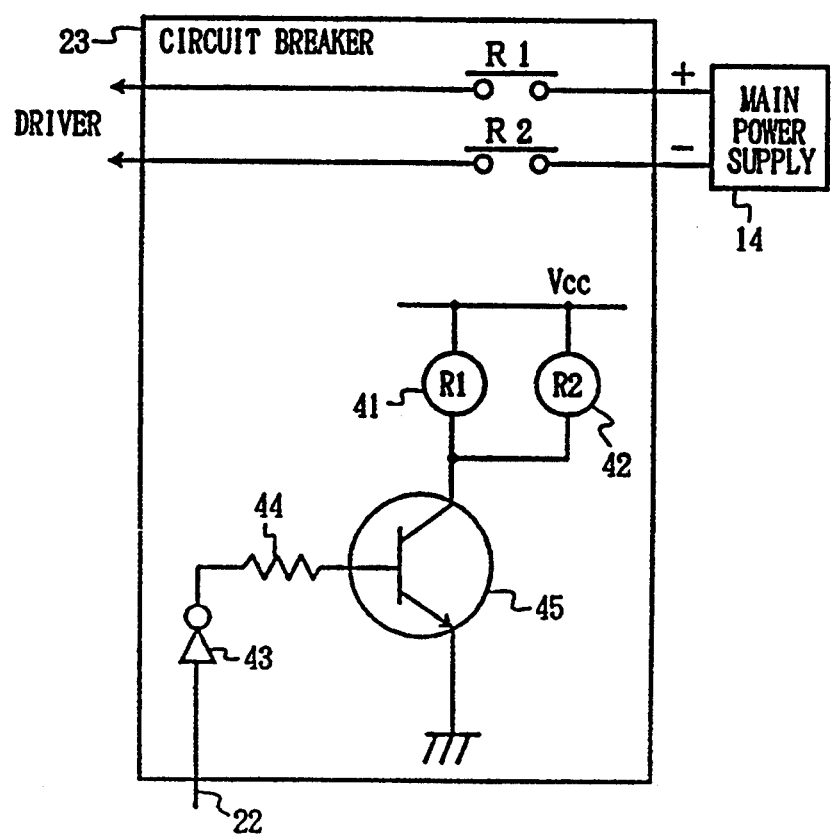
FIG. 5 is a circuit diagram of a circuit breaker in the control unit.

FIG. 5 shows an arrangement of the circuit breaker 23. As shown in FIG. 5, the circuit breaker 23 comprises first and second relays 41 and 42 respectively connected to the positive and negative output terminals of the main power supply 14. As contacts of the first and second relays 41 and 42, A contacts are used.

The circuit breaker 23 comprises a NOT gate 43 for inverting the power supply cutoff signal 22 supplied from the diagnosis section 21 to a low-level signal. The output terminal of the NOT gate is connected to one terminal of a resistor 44, and the other terminal of the resistor 44 is connected to the base of a transistor 45. The emitter of the transistor 45 is grounded, and the collector is connected to a power supply (Vcc) through a coil for operating the first and second relays. The power supply is obtained by dropping the output from the main power supply 14 to 12 V by a DC-DC converter. However, the auxiliary power supply 17 may be used.

The operation of the power supply cut off apparatus for the electrical vehicle with the above arrangement will be described below. Note that the two-step type collision sensors 18 shown in FIG. 2B and the diagnosis section 21 shown in FIG. 4B are used.

(1) When the electrical vehicle is normally traveling

In this case, since the mass 81 of each of the collision sensors 18a to 18e is pressed to the right (FIG. 2B) by the leaf spring 82 wound around the outer circumferential surface of the mass 81, the first and second switches 83a and 83b are kept open. Therefore, the collision sensors 18 do not output high-level collision signals J, and output low-level signals to the diagnosis section 21. The diagnosis section 21 does not output a high-level power supply cutoff signal 22, and supplies a low-level signal to the circuit breaker 23.

In the circuit breaker 23, the input low-level signal is converted into a high-level signal by the NOT gate 43, and the high-level signal is supplied to the base of the transistor 45. Thus, the transistor 45 is turned on, and operates the A contacts of the first and second relays 41 and 42. Thus, a power supply voltage is supplied from the main power supply 14 to the driver 24, and a normal operation can be maintained.

(2) When the electrical vehicle collides

When a shock (deceleration) beyond the spring constant of the leaf spring 82 is applied to the electrical vehicle upon collision, the mass 81 is rotated to the left (FIG. 2B) to close the switch 83a, and when a stronger shock is applied, the switch 83b is also closed. Thus, the collision sensors 18a to 18e output the collision detection signals Ja to Je to the diagnosis section 21.

For example, when the right front side of the electrical vehicle collides against an obstacle, the collision sensor 18a in front of the right side frame, which sensor receives the strongest shock, and the collision sensor 18c in the passenger's room operate, and high-level collision detection signals Ja and Jc are supplied to the diagnosis section 21. In this case, the collision sensor 18c arranged at a position relatively separate from the collision portion also operates since the spring constant until the mass 81 reaches the first switch 83a is set to be slightly lower than those of the remaining collision sensors.

In the diagnosis section 21, the OR gate 31 outputs a high-level signal in response to the collision detection signal Ja, and the AND gate 32 outputs a high-level power supply cutoff signal 22 in response to the signal output from the AND gate 32 and the collision detection signal Jc.

When a stronger shock is applied to the electrical vehicle, the second switch 83b is closed, and at least one of the collision sensors 18a to 18e outputs a corresponding one of the collision detection signals Ja' to Je', the OR gate 33 outputs a high-level power supply cutoff signal 22.

The power supply cutoff signal 22 output from the diagnosis section 21 is supplied to the circuit breaker 23, and is inverted to a low-level signal by the NOT gate 43. Therefore, a current supply to the base of the transistor 45 is stopped, and the transistor 45 is turned off. For this reason, the contacts of the first and second relays 41 and 42 return to be disconnected from the output terminals of the main power supply 14.

After the collision sensors 18 detect the collision, the operation for returning the first and second relays 41 and 42 is instantaneously performed, thereby preventing short-circuiting of the wiring of the main power supply 14 upon collision.

In the embodiment described above, when the rolamite type collision sensors 18 (shown in FIG. 2A) are used, even when one of the four collision sensors 18a, 18b, 18d, and 18e arranged before and after the side frames operates, the diagnosis section 21 does not output a power supply cutoff signal 22. Only when one of the sensors 18a, 18b, 18d, and 18e operates together with the collision sensor 18c, whose spring constant is set to be slightly lower than those of the remaining collision sensors, can the power supply cutoff signal 22 be output, thus preventing an erroneous operation.

The diagnosis section 21 may have an arrangement such that when at least two of the four collision sensors 18a, 18b, 18d, and 18e operate, the power supply cutoff signal 22 is output even when the collision sensor 18c does not operate. Thus, even if the collision sensor 18c malfunctions, the diagnosis section 21 can operate, and safety can be assured.

When the two-step type collision sensors 18 (shown in FIG. 2B) are used, the diagnosis section 21 outputs the power supply cutoff signal 22 even when the second switch 83b of one of the collision sensors 18 operates upon reception of a stronger shock. Therefore, the diagnosis section 21 can detect collision states corresponding to various situations.

In this manner, the type, number, and positions of the collision sensors 18a–18e are not limited to those of this embodiment, and may be modified. The diagnosis section 21 may be arranged to output the power supply cutoff signal 22 in accordance with collision detection signals J output from the corresponding collision sensors 18.

Figure 6:
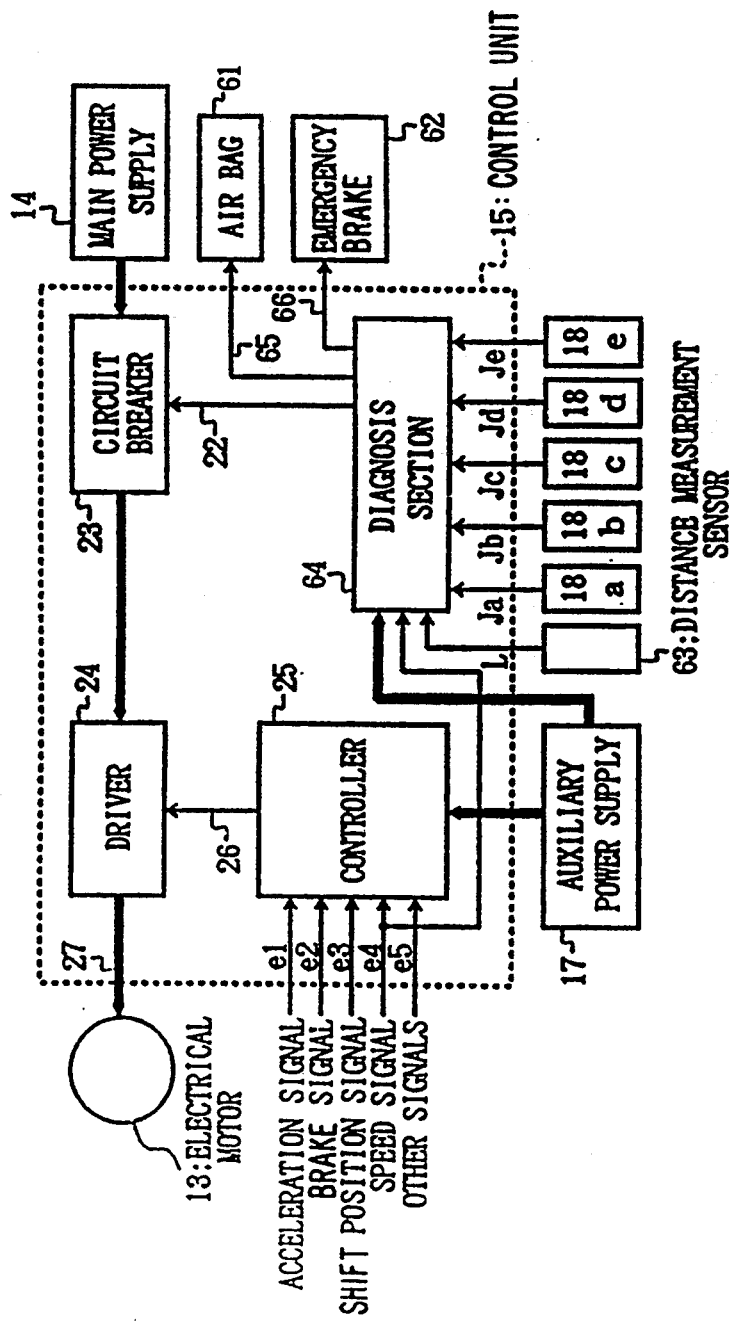
FIG. 6 is a block diagram showing a circuit arrangement of a control unit and its peripheral circuits according to the second embodiment of the present invention.

The second embodiment of the present invention will be described below. FIG. 6 shows the arrangement of a control unit 15 and its peripheral circuits.

This electrical vehicle has an air bag 61 arranged in the central portion of a steering wheel, and an emergency brake 62 for automatically effecting braking in an emergency condition.

Furthermore, distance measurement sensors 63 for respectively measuring distances to obstacles present before and after the vehicle are arranged at the front and rear central portions of a main body 11. Each distance measurement sensor measures a distance by means of microwaves or optical radar (not shown).

On the other hand, a diagnosis section 64 as a collision diagnosis means comprises a CPU (not shown). The CPU judges various states of the electrical vehicle on the basis of collision detection signals Ja to Je supplied from collision sensors 18, distance signals L supplied from the distance measurement sensors 63, and a speed signal e4. The CPU outputs a power supply cutoff signal 22, an ignition signal 65 for igniting the air bag 61, and an emergency brake signal 66 according to the judgment content.

The above-mentioned operation is performed according to a control program stored in a ROM (not shown).

Figure 7:
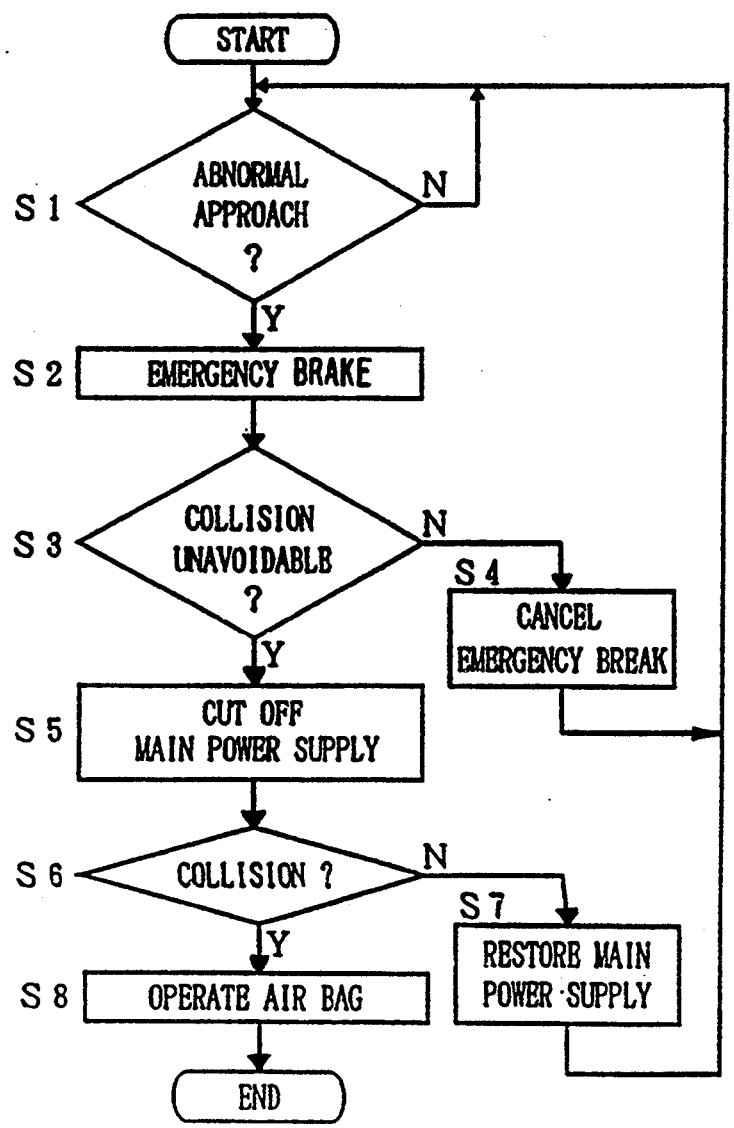
FIG. 7 is a flow chart showing an operation of the second embodiment.

The operation of the second embodiment with the above arrangement will be described below with reference to the flow chart of FIG. 7. Note that steps are represented by "S" in FIG. 7.

The CPU of the diagnosis section 64 monitors an abnormal approach state between the electrical vehicle and an obstacle such as another vehicle (step 1). The abnormal approach state is determined by checking, based on the speed signal e4 and the distance signal L supplied from the corresponding distance measurement sensor 63 whether or not an obstacle has approached within a predetermined distance corresponding to the speed of the electrical vehicle.

If the abnormal approach state is determined in step 1 (step 1; Y), the diagnosis section 64 outputs the emergency brake signal 66, and the vehicle is automatically braked by the emergency brake 62 (step 2).

The CPU continues to monitor the state of the electrical vehicle on the basis of the distance signals L and the speed signal e4 to check if a collision is unavoidable even by the emergency brake (step 3). If it is determined that the collision is avoided by the emergency brake (step 3; N), the emergency brake is cancelled (step 4), and the flow returns to step 1 to continue monitoring of an abnormal approach state.

On the other hand, if it is determined that the collision cannot be avoided (step 3; Y), the diagnosis section 64 supplies the power supply cutoff signal 22 to a circuit breaker 23 to cut off a main power supply 14 (step 5).

Thereafter, the CPU of the diagnosis section 64 checks by monitoring collision detection signals J from the collision sensors 18 if the collision occurred (step 6). If it is determined that no collision occurred after an elapse of a predetermined period of time (step 6; N), it is determined that the collision was avoided by the emergency brake or a steering operation, and the main power supply 14 is restored (step 7). Thereafter, the flow returns to step 1 to continue monitoring of an abnormal approach state.

If it is determined based on the collision detection signals J that the collision occurred (step 6; Y), the diagnosis section 64 outputs the ignition signal 65 to operate the air bag 61 (step 8), and ends its processing.

In this manner, according to the second embodiment, the electrical vehicle comprises the air bag 61, the emergency brake 62, and the distance measurement sensors 63, and can execute appropriate processing according to the state of the electrical vehicle, thus assuring further safety.

Note that all of the air bag 61, the emergency brake 62, and the distance measurement sensors 63 need not always be arranged, but at least one of them may be arranged.

The third embodiment of the present invention will be described below.

Figure 8:
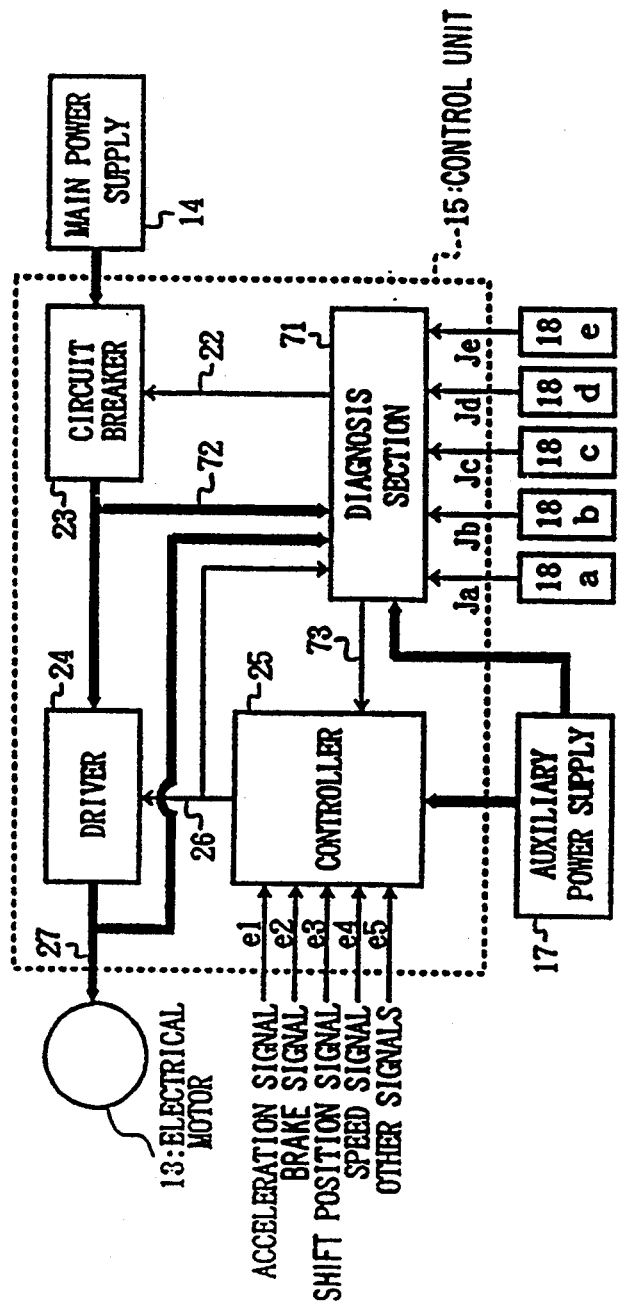
FIG. 8 is a block diagram showing a circuit arrangement of a control unit and its peripheral circuits according to the third embodiment of the present invention.

FIG. 8 shows a circuit arrangement of a control unit 15 and its peripheral circuit of a power supply cutoff apparatus for an electrical vehicle according to the third embodiment. For the sake of simplicity, the same reference numerals in this embodiment denote the same parts as in the first embodiment, and a detailed description thereof will be omitted.

In the third embodiment, a main power supply 14 corresponds to a driving power supply for electrical motors 13, a driver 24 and a controller 25 correspond to the output control means, collision sensors 18a–18e correspond to state detection sensors, a diagnosis section 71 corresponds to part of the power supply cutoff means and abnormality detection means, and a circuit breaker 23 corresponds to another part of the power supply cutoff means.

The power supply cutoff apparatus for this electrical vehicle comprises the diagnosis section 71 as the abnormality detection means. The diagnosis section 71 receives collision detection signals Ja to Je output from five collision sensors 18a to 18e, and also receives a driving signal 26 output from the controller 25 and a main power supply current 72 from the main power supply 14. The diagnosis section 71 also receives a motor current 27.

The diagnosis section 71 comprises a CPU (not shown), detects a collision on the basis of the collision detection signals Ja to Je, and detects other abnormalities such as earth leakage, short-circuiting, and the like on the basis of the driving signal 26 and the main power supply current 72. The diagnosis section 71 detects earth leakage, short-circuiting, and the like by comparing levels of the driving signal 26 and the main power supply current 72 of the driving power supply. Upon detection of an abnormality, the diagnosis section 71 supplies a power supply cutoff signal 22 to the circuit breaker 23, and supplies an abnormality detection signal 73 to the controller 25.

The above-mentioned operations are executed according to a control program stored in a ROM (not shown) of the diagnosis section 71.

Note that the diagnosis section 71 detects a collision using a diagnosis circuit shown in FIG. 4A or 4B. In addition, although not shown, the diagnosis section 71 may comprise a detection circuit for detecting various abnormal states such as earth leakage, short-circuiting, and the like other than a collision so as to detect earth leakage, short-circuiting, and the like by comparing the levels of the driving signal 26 and the output 27 from the driving power supply.

In the first and second embodiments, the first power supply circuit including the main power supply 14 as a high-voltage power supply is opened by releasing the first and second relays 41 and 42. However, in some cases, it is difficult to release the contact of the electromagnetic relay when a large current flows. This is because an arc is generated upon releasing of the contact, and the contact is melted.

In contrast to this, in the third embodiment, when the diagnosis section 71 detects an abnormality, current output operations between electrical motors 13 and the main power supply 14 by the driver 34 and the controller 25 as output control means are stopped, and the circuit breaker 23 is operated to cut off the main power supply 14. When an abnormality of the vehicle is predicted, current supply to the electrical motors 13 or regeneration from the electrical motors 13 to the main power supply 14 is stopped even through the abnormality is caused by either a driving current or a regenerative current due to regeneration, and the first and second relays 41 and 42 are released, thereby preventing melting of the contacts of contacters.

Note that the abnormality detection signal 73 output from the diagnosis section 71 serves as a command for stopping the current output from the electrical motors 13 to the main power supply 14.

FIG. 9 shows the details of the operations in the third embodiment.

A CPU of the diagnosis section 71 monitors whether or not an abnormality occurs in the electrical vehicle (step 11). More specifically, the CPU of the diagnosis section 71 detects a collision on the basis of the collision detection signals Ja to Je supplied from the collision sensors 18a to 18e, and detects various other abnormalities such as short-circuiting, earth leakage, and the like by comparing the levels of the driving signal 26 supplied from the controller 25 and the main power supply current 72.

If an abnormality is detected (step 11; Y), the diagnosis section 71 outputs the abnormality detection signal 73 to the controller 25 (step 12). Upon reception of the abnormality detection signal 73, the controller 25 outputs the driving signal 26 having a value for setting the motor current, i.e., a driving current or regenerative current, between the driver 24 and the electrical motors 13 to be "zero" (step 13).

The driver 24 sets a driving current from the main power supply 14 to the electrical motors 13 or a regenerative current from the electrical motors 13 to the main power supply 14, i.e., the motor current 27 to be "zero" according to the input driving signal 26. In this manner, the main power supply current 72 supplied from the main power supply 14 to the driver 24 via the circuit breaker 23 also becomes "zero".

On the other hand, the diagnosis section 71 monitors the motor current 27 (step 14) after it outputs the abnormality detection signal 73 in step 12. When the motor current 27 becomes equal to or smaller than a predetermined value at which the contacts are not melted even when the contacts of the first and second relays 41 and 42 of the circuit breaker 23 are released (step 14; Y), the diagnosis section 71 operates the circuit breaker 23 (step 15), thus ending the processing. More specifically, the diagnosis section 71 outputs the power supply cutoff signal 22 to the circuit breaker 23. Upon reception of the power supply cutoff signal 22, the circuit breaker 23 cuts off the main power supply 14 like in the first embodiment.

In the third embodiment described above, the diagnosis section 71 outputs the power supply cutoff signal 22 under a condition that the motor current 27 becomes equal to or smaller than the predetermined value in step 14. Alternatively, the diagnosis section 71 may operate as follows. More specifically, the diagnosis section 71 may operate the circuit breaker 23 to cut off the main power supply after an elapse of a predetermined period of time from the output of the abnormality detection signal 73. For this purpose, the diagnosis section 71 may comprise a timer. In addition, although not shown, in place of step 14, the timer may be started simultaneously with the output of the abnormality detection signal 73 to monitor an elapse of a predetermined period of time, and after the elapse of the predetermined period of time, the diagnosis section may output the power supply cutoff signal 22.

In the third embodiment, after the diagnosis section 71 outputs the abnormality detection signal 73, it monitors whether or not the motor current 27 becomes equal to or smaller than the predetermined value. Alternatively, the diagnosis section 71 may monitor the value of the main power supply current 72 so as to actually monitor the value of the current flowing through the relays 41 and 42 of the circuit breaker 23.

As described above, according to the third embodiment, when the diagnosis section 71 detects an abnormality of the vehicle, the main power supply 14 is cut off by the circuit breaker 23 simultaneously when the motor current 27 between the driver 24 and the electrical motors 13 is stopped. Thus, in this embodiment, the contacts of the relays 41 and 42 of the circuit breaker 23 can be released without generating an arc.

In particular, after the diagnosis section 71 outputs the abnormality detection signal 73, it confirms that the motor current 27 becomes equal to or smaller than a predetermined value in the third embodiment, or it confirms an elapse of a predetermined period of time using the timer in the modification of the third embodiment, and thereafter, the diagnosis section 71 outputs the power supply cutoff signal 22 to operate the circuit breaker 23. In this manner, since the contacts are released after a current flowing through the relays 41 and 42 of the circuit breaker 23 becomes "zero" or a small current value, the contacts can be reliably released.

In each of the embodiments described above, when it is determined that a collision of the electrical vehicle occurred or a collision is unavoidable, the output from the main power supply 14 to all of the circuits is cut off. However, the output from the main power supply 14 to some circuits may be cut off. For example, the power supply voltage to be supplied to the driver 24 may be cut off upon collision, but the power supply voltage may be supplied to, e.g., the power steering device even upon collision. Thus, further safety can be assured.

In each of the embodiments described above, the electrical vehicle which generates the driving force by only an electrical power from the main power supply has been exemplified. However, the present invention is not limited to this arrangement. For example, the present invention may be applied to an electrical vehicle, which electrically generates at least some driving force, and also obtains the remaining driving force from an internal combustion engine.

The preferred embodiments described in the present specification are merely examples, and are not limiting ones. Various changes and modifications of the preferred embodiments may be made within the spirit and scope of the invention claimed below.

In other words, the scope of the invention is clarified by the appended claims, and all the modifications included in the scope of these claims are included in the present invention.

What is claimed is:

1. A power supply cut off apparatus for an electrical vehicle, comprising:
    an electric motor for driving said electrical vehicle;
    a first power supply circuit for driving said electric motor;
    a state detection sensor for detecting a state of said vehicle;
    collision diagnosis means for diagnosing a collision state of said vehicle on the basis of a state detection signal output from said state detection sensor; and
    power supply opening means for opening said first power supply circuit according to a diagnosis result from said collision diagnosis means.

2. An apparatus according to claim 1, further comprising a second power supply circuit having a voltage that is lower than a voltage of said first power supply circuit, said second power supply circuit being used as a power supply for auxiliary devices provided in said electrical vehicle.

3. An apparatus according to claim 2, wherein said second power supply circuit uses a vehicle body as an electric loop, and said first power supply circuit does not use the vehicle body as an electric loop.

4. An apparatus according to claim 1, wherein said power supply opening means includes an electromagnetic relay connected to said first power supply circuit, and said power supply opening means opens said first power supply circuit by actuating said electromagnetic relay.

5. An apparatus according to claim 1, wherein said state detection sensor comprises an electrical sensor for detecting a collision electrical vehicle by integrating a signal output from an accelerometer.

6. An apparatus according to claim 1, wherein said state detection sensor comprises a rolamite type sensor which uses a roller-like mass as an inertial member for detecting deceleration, and a leaf spring that is wound around said mass.

7. An apparatus according to claim 1, wherein said state detection sensor comprises a viscous damping type sensor for detecting a collision of said electrical vehicle by a mass arranged in a cylinder based on an attracting force of a magnet and a viscous force of air passing through a gap between said mass and said cylinder.

8. An apparatus according to claim 1, wherein said state detection sensor is arranged at least in front of side frames of said electrical vehicle, in a front portion of a passenger's compartment between a driver's seat and a front passenger's seat, and behind said side frames.

9. An apparatus according to claim 1, wherein said state detection sensor comprises a distance sensor for measuring a distance to an obstacle, and a vehicle speed sensor for measuring a vehicle speed, said collision diagnosis means determines an abnormal approach state to the obstacle based on measurement values from said distance sensor and said vehicle speed sensor, and said power supply opening means opens an electrical output from said first power supply circuit when said collision diagnosis means determines the abnormal approach state.

10. A power supply cut off apparatus for an electrical vehicle, comprising:
    an electric motor for driving said electrical vehicle;
    a power supply for driving said electric motor;
    output control means for controlling an electrical output from said driving power supply to said electric motor;
    a state detection sensor for detecting a state of said vehicle; and
    power supply cut off means for instructing said output control means to stop electrical power output and cutting off said power supply when an abnormal condition is detected based on an output from said state detection sensor.

11. An apparatus according to claim 10, wherein when an abnormal condition is detected based on an output from said state detection sensor, said power supply cut off means instructs said output control means to stop electrical power output and cuts off said power supply after an elapse of a predetermined period of time.

12. An apparatus according to claim 10, wherein when an abnormal condition of said vehicle is detected on the basis of an output from said state detection sensor, said power supply cut off means instructs said output control means to stop electrical power output and, thereafter, cuts off said power supply.

* * * * *